United States Patent
Erlichman

[15] 3,682,062
[45] Aug. 8, 1972

[54] PHOTOGRAPHIC PRODUCT
[72] Inventor: Irving Erlichman, Wayland, Mass.
[73] Assignee: Polaroid Corporation, Cambridge, Mass.
[22] Filed: Nov. 21, 1969
[21] Appl. No.: 878,747

[52] U.S. Cl. ..............................95/13, 95/22, 95/30
[51] Int. Cl. ............................................G03b 17/52
[58] Field of Search...................95/13, 14, 22, 30, 66

[56] References Cited
UNITED STATES PATENTS

| | | | |
|---|---|---|---|
| 1,823,321 | 9/1931 | Hammond | 95/30 |
| 2,978,971 | 4/1961 | Eburn | 95/13 |
| R26,921 | 6/1970 | Erlichman | 95/13 |
| 1,613,378 | 1/1927 | Boniforti | 95/30 |
| 1,066,955 | 7/1913 | Schmuck | 95/30 |
| 1,557,085 | 10/1925 | Piller | 95/30 |

*Primary Examiner*—John M. Horan
*Assistant Examiner*—Alan A. Mathews
*Attorney*—Brown and Mikulka and Robert E. Corb

[57] ABSTRACT

A photographic film pack of the self-developing type comprising a container having a substantially constant volume divided into forward and rear chambers by a movable divider and a plurality of self-developing film units arranged in stacked relation in the forward chamber. The container includes an exposure aperture and openings permitting an exposed film unit to be withdrawn from the forward chamber for processing, to be introduced into the rear chamber for continued processing and/or storage, to be withdrawn from the rear chamber for examination, and to be returned to the rear chamber for storage following examination. The film pack also includes light shields for the exposure aperture and at least the withdrawal opening and a retaining member permitting introduction of a film unit through the opening through which film units are first introduced into the rear chamber while restraining the film unit against movement from the rear chamber through the same opening; and a resilient element for supporting film units in position for exposure. The divider includes a battery for operating a component of the photographic apparatus in which the film pack is employed and provides a light seal between the forward and rear chambers. The aggregate volume of the forward and rear chambers, in addition to being constant, is substantially the minimum sufficient to contain the unexposed film units and light shields initially contained within the container.

48 Claims, 5 Drawing Figures

PHOTOGRAPHIC PRODUCT

In the copending U.S. Pat. application of Irving Erlichman, Ser. No. 878,638, filed on an even date herewith and entitled Photographic Apparatus and Method, now abandoned and replaced by application Ser. No. 880,794, filed Nov. 28, 1969, there is described a photographic system, specifically apparatus such as a camera or camera back, and a method employing a photographic film assemblage or pack including a container and a plurality of self-developing film units contained therein. Each film unit is exposed within the container of the film pack, withdrawn therefrom for processing in which a liquid processing composition is distributed within the film unit and then the film unit is returned to the container of the film pack. The camera is similar in many respects to the camera shown and described in the copending U.S. Pat. application of Irving Erlichman, Ser. No. 179 filed Jan. 2, 1970 and entitled Photographic Apparatus; and is capable of automatically processing film units and returning them to the pack so that the operator need only load a film pack into the camera, expose the film units and then remove from the camera the same film pack now containing a plurality of processed film units, each containing a visible image, and preferably constituting a completed positive photographic print requiring no further treatment.

An object of the present invention is to provide a novel and improved film assemblage, or film pack, especially adapted for use in a photographic system of the type described, and specifically including a container holding a plurality of self-developing film units with provision for withdrawing the film units, one at a time, for processing and then returning them to the container for continued processing and storage.

An important feature of the photographic apparatus, e.g., camera back, described in the aforementioned Erlichman application, Ser. No. 179, is compactness and small size relative to the size of the film pack and image produced. The apparatus is designed to utilize a film pack, including film units which must be retained in a light-free environment, during a period of predetermined duration, e.g., a few seconds to a minute or more, following withdrawal from the pack and commencement of processing, thus making it necessary to provide space within the apparatus (or in means coupled therewith) in which one or more film units can be retained in a light-free environment until processing has advanced to the stage wherein image quality is no longer affected by exposure of a film unit to ambient light. The apparatus and method of the Erlichman application, Ser. No. 878,638, solve this problem of providing a light-free space for temporary storage of in-process film units by returning each film unit to the container of the film pack from which the film unit was withdrawn so that additional space is not required in the apparatus for storing in-process film units. This clear advantage is attributable, at least in part, to the novel and improved film pack structure provided by the present invention.

Another important feature of the film pack of the invention, as well as the system in which it is employed, is the provision of means permitting withdrawal of one or more processed film units from the film pack without the necessity for removing the film pack from the camera and/or exposing any other film unit remaining within the film pack. Thus the operator is able to examine a film unit as soon as processing thereof has advanced to the stage where image quality is not affected by ambient light and need not wait until all of the film units, e.g., eight or 10, contained in the film pack, have been exposed and processed.

The film pack structure of the invention provides a further advantage in that it permits a processed film unit, withdrawn for examination, to be inserted into the pack within the camera, thereby providing a convenient place for storing film units which have been processed and examined.

Still another unique advantage of the self-developing film pack of the invention is its essential contribution to a photographic system which eliminates manual film handling from the self-developing process performed in a camera. It is now possible for the operator to load a multiple exposure film pack into a camera, expose and process all of the film units initially contained in the film pack, and then unload the film pack containing the completed photographic prints from the camera, thus handling the film only during loading and unloading. There are no film components to be withdrawn from the camera during exposure or processing of successive film units so that there is no longer the nuisance of providing for discarding such components or storing them outside of the camera. Moreover, loading and unloading, the only manual operation required of the operator, are simple operations that can be performed rapidly and do not provide an opportunity for improper operation of the camera.

The present invention provides an essential contribution to still a further objective, namely, a compact, automatic, self-developing photographic system in which it is possible to expose film units at a frequency limited only by the time required, e.g., a fraction of a second to perform a processing operation on each film unit, namely, to withdraw the film unit from the film pack, distribute a processing liquid within the film unit, and then return the film unit to the film pack.

The invention, accordingly, comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
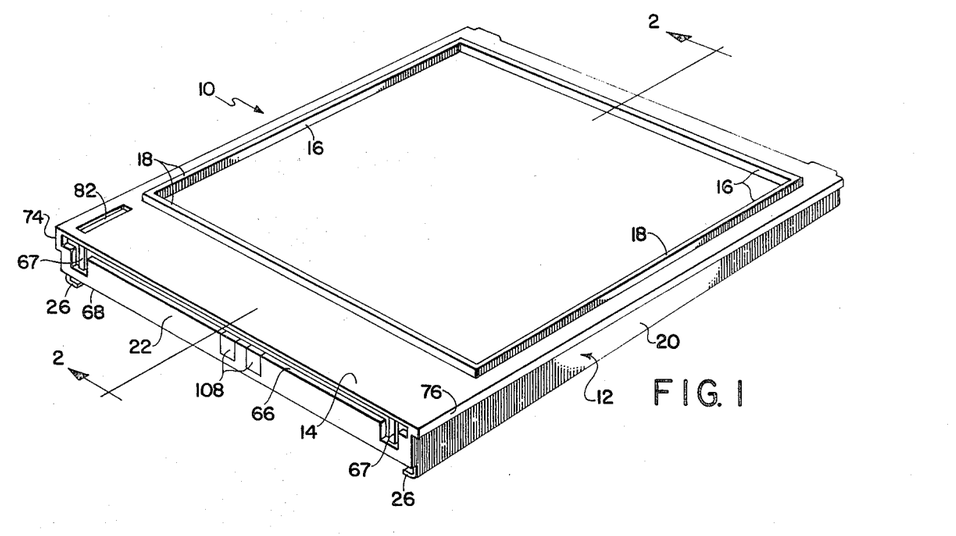
FIG. 1 is a perspective view of a photographic film pack embodying the invention.
Figure 2:
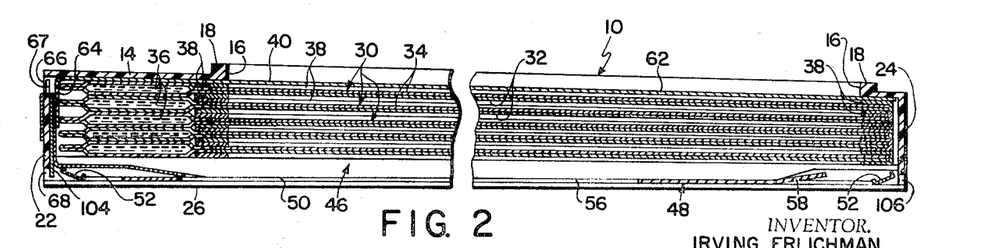
FIG. 2 is a longitudinal, sectional view of the film pack taken substantially along the line of 2—2 of FIG. 1.

The present invention is concerned with a photographic film assemblage, particularly a film pack, especially adapted to be employed in photographic apparatus such as a camera of the type described in detail in the copending Erlichman application Ser. No. 878,638. Such a film pack, designated 10, incorporating the invention is illustrated in FIGS. 1 and 2 of the drawings as including a box or container 12 having the general form of a relatively thin parallelepipedon, thinner at one end than at the other. Container 12 includes a rectangular forward wall 14 formed with a rectangular exposure aperture 16 surrounded by a raised lip 18; side walls 20 tapering slightly from the leading end of the film pack toward the trailing end thereof; a leading end wall 22; trailing end wall 24; and rear wall portions 26 in the form of flanges extending towards one another from the rear edges of side walls 20. An alternative form of the film pack shown in FIG. 3 includes a rear wall extending completely across the rear of the container from one side wall 20 to the other. Container 12 is designed to be fabricated easily and inexpensively, for example, of polymeric materials, by conventional moulding processes.

Container 12 is designed to hold and enclose, in a light-free environment, a plurality, e.g., eight or 10, selfdeveloping photographic film units 30 of the type shown and described in the following patents and copending applications commonly assigned herewith: U.S. Pats. of Edwin H. Land, Nos. 3,415,644; 3,415,645; and 3,415,646, dated Sept. 10, 1968; U.S. Pat. of Terry W. Milligan et al., No. 3,473,925, dated Oct. 21, 1969; U.S. application of Edwin H. Land, Ser No. 622,287, filed Mar. 10, 1967; and U.S. application of Albert J. Bachelder it al, Ser. No. 744,912, filed July 15, 1968.

Each film unit 30 comprises all the materials required to effectuate an image-forming process, preferably for producing a positive photographic print formed by a diffusion-transfer process. In such processes, a photographic, image-recording element including a photosensitive, image-recording material, such as silver halide, is exposed to form an image (latent), and is treated by wetting it with a liquid processing agent to develop the image in the image-recording material, form an image-wise distribution of transferable image-providing substances and transfer the image-providing substances by diffusion to an image-receptive stratum, in which they are immobilized to form a visible, positive image. Although the preferred film unit disclosed is adapted to produce a photographic print in full color, it should be understood that the film unit may comprise materials for performing a variety of processes including, for example, producing a black-and-white print according to processes such as disclosed in the U.S. Pats. of Edwin H. Land, No. 2,543,181, granted Feb. 27, 1951, and No. 2,662,822, granted Dec. 15, 1953; or may include all the materials and reagents required to produce a full color photographic print by a process such as disclosed in U.S. Pat. of Howard G. Rogers, No. 2,983,606, issued May 9, 1961. This last-mentioned patent and the aforementioned Land U.S. Pat. Nos. 3,415,644, 3,415,645, and 3,415,646 and the Milligan et al. patent disclose a photosensitive element including a silver halide emulsion and a dye developer, i.e., a dye which is a silver halide developing agent. The photosensitive element is a component of a film unit comprising a second or image-receiving element, including an image-receiving layer of a dyeable material, and a processing liquid in which the dye developer is soluble. To process the film unit following exposure, the photosensitive and image-receiving elements are superposed with the emulsion and image-receiving layers facing one another, and the processing liquid is distributed in a uniform layer between the elements for permeation into the photosensitive layer where the liquid initiates development of exposed silver halide. The dye developer is immobilized or precipitated in exposed areas as a consequence of development while in unexposed areas and partially exposed areas of the emulsion; the dye developer remains unreacted and diffusible, thereby providing an image-wise distribution of unoxidized dye developer which is transferred, at least in part, by diffusion to the image-receiving layer without altering the image-wise distribution of the dye developer, to form a reversed or positive color image of the developed latent image in the emulsion.

Each film unit 30 is illustrated in the drawings as comprising a sheet-like, photosensitive or image-recording element 32, a sheet-like second or image-receiving element 34, and a rupturable container 36 holding a quantity of processing liquid. Sheets 32 and 34 are rectangular and coextensive with one another and are arranged in superimposed, face-to-face contact with at least the lateral edges of each sheet aligned with the lateral edges of the other. A binding element 38 is secured to the two sheets at the margins thereof for retaining the sheets in face-to-face relation, and includes rectangular exposure aperture 40 substantially coextensive with exposure aperture 16 in the forward wall of the container, and adapted to define the extent of the image produced in the film unit.

Figure 3:
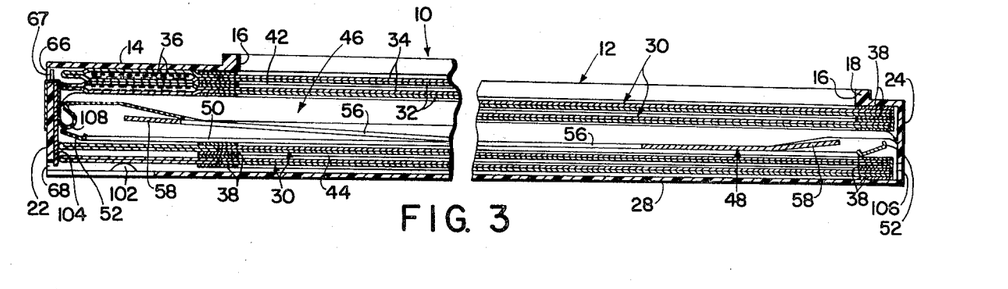
FIG. 3 in a view similar to FIG. 2 of another embodiment of the film pack.
Figure 4:
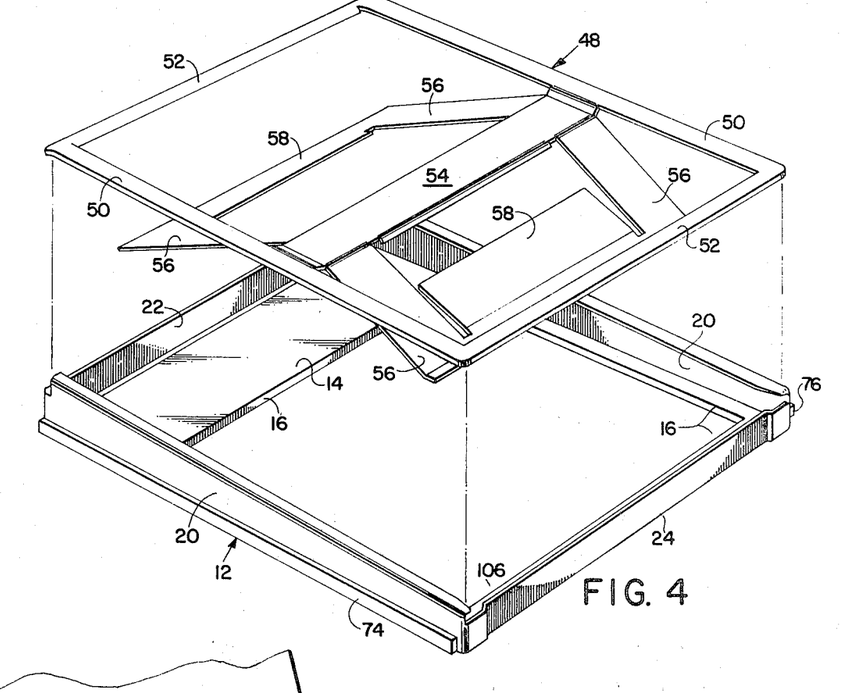
FIG. 4 in an exploded, perspective view of components of the film pack.

The film pack 10 includes means for dividing container 12 into a forward chamber or section 42 and a rear chamber or section 44. The means for dividing the container include a divider 46, dimensioned to engage the side and end walls of the container and having a generally planar forward surface and means in the form of a spring assembly 48 for biasing divider 46 toward the forward wall of the container. The spring assembly 48 is preferably formed of a single, rectangular blank of a resilient sheet material such as metal and includes a pair of lateral members 50, disposed in a common plane and connected at their ends by transverse members 52 and intermediate their ends by a transverse member 54. The ends of lateral members 50 and transverse members 52 may be bent forwardly as shown in FIGS. 2 and 3, and transverse member 54 is displaced forwardly from the plane of lateral members 50. The spring assembly is designed to be located within rear section 44 of the film pack container between divider 46 and rear wall 28, with the rear surfaces of lateral members 50 supported against rear wall portions 26 (or rear wall 28), and with transverse members 52 and 54 displaced forwardly of the forward surface of the rear wall portions. Spring assembly 48 includes two pairs of cantilever springs 56 extending from transverse member 54 forwardly and toward members 52. Each pair of cantilever springs 56 is joined by a connecting member 58 and is adapted to engage the rear surface of divider 46 for urging the divider forwardly within the film pack container.

The divider, relatively stiff or rigid, is designed to prevent the passage of light between the forward and rear sections of the film pack container and is constructed to engage the end and side walls of the container so as to prevent light from passing between the divider and the container walls. In the embodiment shown in FIG. 3, the end and side edges of the divider are thinner and more flexible than the medial portion thereof and are bent rearwardly so as to provide surfaces resiliently biased into engagement with the inner surfaces of the end and side walls. In an alternate embodiment illustrated in FIG. 5, strips 60 of a light-sealing material such as felt, flocking, pile, etc., are secured to the edges of divider for engaging the end and side walls of the container in a light-tight manner.

A plurality, e.g., eight or 10, of film units 30 are mounted in stacked relation within forward section 42 of the film container between forward wall 14 and divider 46. The dimensions of the film pack container are preferably such that the film units, dividing member and spring assembly occupy substantially all of the space within the film pack container, the container being expanded toward the leading end of the container to accommodate the additional thickness of liquid containers 36. Spring assembly 48 urges divider 46 toward the forward wall so that the divider, being rigid, supports the forwardmost film unit 30 against the forward wall in position for exposure to light transmitted through exposure opening 16.

Film pack 10 is adapted to be employed in photographic apparatus designed to advance the foremost film unit, following exposure thereof, leading end first, i.e., with container 36 foremost, from the film pack container 12, distribute the liquid contents of container 36 between the photosensitive and image-receiving elements of the film unit, and then return the film unit, trailing end foremost, to the rear section of the film pack to a position behind spring assembly 48, between the latter and the rear wall (or rear wall portions) of the film pack container. Accordingly, the film pack container is provided with a first or withdrawal opening 66 in the form of a slot in leading end wall 22 adjacent forward wall 14, in alignment with the forwardmost film unit, and adapted to pass the forwardmost film unit from the interior of the forward section of container 12 to the exterior of the container. The shorter dimension of opening 66 is preferably only slightly greater than the maximum thickness of a film unit 30 so as to permit movement of only one film unit at a time through the opening. Means in the form of relatively flexible members 67 formed integrally from leading end wall 22 and extending at least part way across first opening 66 are provided for resisting movement of a film unit through the first opening and preventing movement (due to friction) of more than one film unit at a time into the first opening.

A second opening 68 is provided at the leading end of the film pack container, between the rear edge of leading end wall 22 and rear wall portions 26 (or rear wall 28), for admitting a film unit, moved trailing end foremost, into the rear section of the film pack container. Second opening 68 is also preferably dimensioned to pass only one film unit at a time and may be narrower than opening 66 inasmuch as the second opening is required to pass a container 36 of a film unit in a compressed and empty condition in which the container no longer constitutes the thickest part of the film unit.

Figure 5:
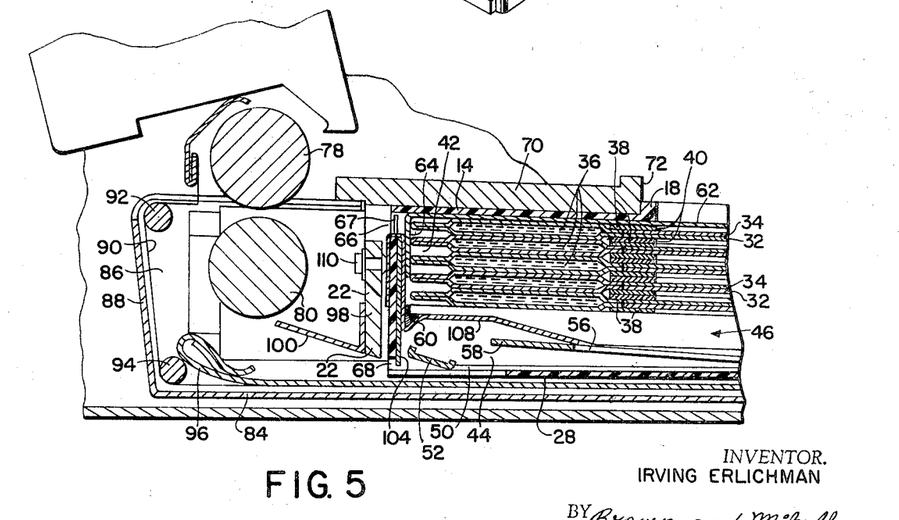
FIG. 5 is a fragmentary, sectional view showing the film pack in photographic apparatus, such as a camera, for exposing and processing the photosensitive elements of the film pack.

The film pack 10 of the invention is designed to be employed in photographic apparatus such as a camera, and particularly a camera of the type shown and described in the aforementioned Erlichman applications Ser. Nos. 179 and 878,638. A portion of such a camera is illustrated in FIG. 5 of the drawing as comprising a housing for enclosing and locating film pack 10 in position for exposure, and enclosing and mounting the operating components of the camera which handle and process the film units of the film pack. The camera housing shown includes a forward wall 70 having an exposure opening 72 in which lip 18 is engaged for properly locating the film pack, and side walls (not shown), including channels for engaging flanges or rails 74 and 76 on side walls 20 of the film pack container to support the latter within the camera. It should be noted that the forward to rear dimension of rail 74 is greater than the corresponding dimension of rail 76. The channels adapted to receive the rails are also of different widths so as to cooperate with the rails to prevent improper loading of the film pack into the camera.

Film units 30 are adapted to be processed by applying compressive pressure to each film unit, commencing with the container 36 and progressing toward the trailing end of the film unit, to discharge the fluid contents of the container between the leading end portions of photosensitive and image receiving elements 32 and 34, and then spread the liquid in a thin layer between the elements at least coextensive with the exposed area of the photosensitive element. The camera illustrated in FIG. 5 includes means in the form of a pair of juxtaposed rolls 78 and 80 for applying compressive pressure to the film unit as the film unit is advanced between the rolls. The film unit is preferably advanced between the rolls by rotating the rolls in engagement with the film unit, and the camera includes means for driving the rolls. To process the foremost film unit following exposure thereof, the leading end of the film unit is advanced from exposure position within the container through first opening 66, into the bite of the rolls, which are rotated to continue the motion of the film in the same direction while maintaining the substantially planar configuration of the film unit. The camera includes means (not shown) adapted to extend through a film engagement slot 82 in forward wall 14, adjacent one side of the film pack container between exposure opening 16 and the leading edge of the forward wall into engagement with the foremost film unit. These last mentioned means are adapted to engage an opening (not shown) in the lateral margin of the container 36 of the foremost film unit and are moved in engagement with the container to advance the film unit into the bite of rolls 78 and 80.

The camera includes a drawer shown as comprising a rear wall 84, side walls 86, and an end wall 88, mounted for reciprocating motion within the camera housing, outwardly from an initial position shown in FIG. 5, for supporting and enclosing a film unit as the latter is advanced between and from engagement with rolls 78 and 80. A flexible curtain 90, secured at one end to the camera housing adjacent roll 78 and extending around guide rollers 92 and 94 mounted on the drawer, is adapted to cooperate with the drawer, as the latter is extended from its initial position, to form a light-tight chamber for enclosing and protecting the film unit from exposure to ambient light. A spring clip 96, mounted within the drawer, is designed to engage the leading end of a film unit, displace the trailing end of the film unit rearwardly, and then return the film unit to a position behind its exposure position during return movement of the drawer to its initial position.

The camera housing includes an end wall 98 for supporting a guide member 100, adapted to cooperate with another guide member (not shown) mounted near the end of the drawer (trailing end) furthest from clip 96, for guiding a film unit through second opening 68 into the rear section 44 of the film pack container as the drawer is returned to its initial position, and the film is moved by clip 96. The drawer also includes means near the end thereof furthest from clip 96 for engaging lateral members 50 adjacent the leading ends thereof to displace the lateral members forwardly to facilitate movement of the trailing end of the film unit between the lateral members and rear wall(or rear wall portions)of the film pack container. It is to enable such means to engage the lateral members that the end portion of rear wall 28 is set back from opening 68.

In the embodiment of the film assembly shown in FIG. 3, the container 36 of the rearmost film unit located in the rear section of the film pack container between the lateral members and rear wall is displaced forwardly to facilitate insertion of a film unit, by small bumps 102 provided on the forward surface of the rear wall (or rear wall portions) adjacent the side walls of the container.

It will be appreciated that a film unit held by spring clip 96 will be moved only part way into the container during return movement of the drawer to its initial position, and for this reason, a film engaging member (not shown) is mounted on the drawer near the end furthest from the spring clip, for engaging the leading end of the film unit during the next succeeding movement cycle of the drawer to move the film unit completely into the container. It will also be apparent that as the drawer is extended during the next processing cycle, there will be a tendency for the film unit, engaged by spring clip 96, to be withdrawn from the rear section of the film pack container through opening 68. Accordingly, means are provided for restraining film units against movement from the container through opening 68, and in the form shown, these means comprise a retaining member 104 in the form of a thin, resilient element mounted on the inside of leading end wall 22. Member 104 extends rearward at least part way across opening 68 toward the rear wall (or rear wall portions) so as to at least partially block the opening. Member 104 is bent inwardly in response to engagement with a film unit during introductory movement thereof through the opening into the container, and resists withdrawal movement of the film unit in the opposite direction because of the necessity for and difficulty of bending retaining member 104 outwardly in order to withdraw the film unit.

The film pack is adapted to be employed with apparatus such as a camera having an exposure and/or processing system that is electrically actuated. For example, the processing system including rolls 78 and 80, the tray and the means for feeding the foremost film unit into the bite of the processing rolls, may be driven by a motor adapted to be powered by electricity. In the preferred embodiment of the film pack, divider 46 comprises a battery for producing sufficient current to operate the camera to expose and/or process the film units contained in the film pack. The film pack includes means for coupling the electrodes of the battery to the electrically operated components of the camera. These means include a pair of flexible conductive strips 108, each connected to an electrode of the battery, extending through first opening 66 to the exterior of the film pack container where the conductive strips are secured to leading end wall 22 in position for engagement by contacts 110, mounted in the camera on end wall 98, and coupled to the electrical components of the camera. Conductive strips 108 may, in an alternate embodiment, extend through second opening 68, in which case they would be provided with sufficient slack to permit the unhindered movement of the battery forwardly within the film pack container. The preferred embodiments of the camera and the film pack include structure designed to permit the loading of the film pack into the camera by moving the pack lengthwise, leading end first, into the camera housing to engage flanges 74 and 76 in the channels within the camera housing. It is for this reason that the preferred location for the portions of the conductive strips 108 adapted to engage the contacts in the camera are on the leading end wall of the container since it enables the contacts in the camera to be spring loaded into engagement with the conductive strips to better assure good electrical contact.

Film pack container 12 is provided with a third opening 106 at the trailing end of the container adjacent rear wall 28 or rear wall portions 26, dimensioned to permit the withdrawal of at least one film unit at a time from the rear section, trailing end first, from the container. The pack is adapted to be employed in an apparatus, such as a camera, having means, such as a door, which may be opened to permit the manual withdrawal of a film unit from the film pack and camera for examination. The structure of the film pack and apparatus in which it is employed also permit the operator to insert a film unit back into the rear section of the camera housing for storage therein after the film unit has been examined. In this way, the film pack provides the operator with the option to examine any or all film units after processing thereof has advanced to the extent that each film unit is no longer subject to impairment by exposure to actinic light; and/or to store any or all of the film units within the film pack container until it is time to reload the camera. Inasmuch as each processed film unit returns to the pack to a position behind the divider and spring assembly and occupies the same (or less) space originally occupied within the film pack container, and the volume of the forward section of the container is decreased while the volume of the rear section of the container is increased as the film unit is withdrawn from the forward section, the container will hold, for storage, all of the film units and the dark slide initially contained in the film pack. Thus, the operator, if he wishes, need only load the film pack into a camera in order to make a succession of photographic prints, and then withdraw the pack from the container after exposing and processing all of the film units comprising the pack.

The film pack is initially provided with means for preventing admission of ambient light into the forward section of the film pack through exposure aperture 16, withdrawal opening 66 and film engagement slot 82. In the embodiment shown, these means take the form of a dark slide 62 formed of a relatively inflexible, light opaque material such as an organic plastic or cardboard, engaged between the foremost film unit 30 and the inner surface of forward wall 14. Dark slide 62 is approximately coextensive in size with the film units and is provided on its leading end with skirt 64 formed of a flexible, light opaque sheet material or film equal in width at least to the space between side walls 20 of the camera housing and extending rearwardly across withdrawal opening 66 enclosing relation thereto, and between leading end wall 22 and the leading edges of film units 30, specifically the leading edges of container 36. Prior to exposure to the foremost film unit, the dark slide 62, together with skirt 64 attached to the leading edge thereof, is advanced from the film pack container through withdrawal opening 66 and is moved within the photographic apparatus in which the film pack is employed, in the same manner as a film unit, into the rear section of the container to a position at which it can be withdrawn manually from the container and camera.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assemblage comprising, in combination:
    a container including forward, side and end walls, said forward wall including means defining an exposure aperture;
    divider means located behind said forward wall dividing said container into forward and rear sections;
    at least a photosensitive film unit including a layer of a photosensitive image recording material and a liquid processing composition for initiating formation of a visible image upon permeation into said layer following exposure thereof;
    said film unit being disposed in said forward section and said divider means being movable at least forwardly within said container to urge said film unit toward said forward wall into position for exposure to light transmitted by said exposure aperture and to reduce the volume of said forward section while increasing the volume of said rear section upon withdrawal of said film unit from said forward section;
    said container being formed at one end with a first opening communicating with said forward section and the exterior of said container, being dimensioned and located to pass said film unit, leading end foremost, from the exposure position of said film unit to the exterior of said container;
    closure means located between said forward wall and said film unit for preventing admission of light through said exposure aperture prior to loading of said film assemblage into photographic apparatus, said closure means being movable, leading end foremost, through said first opening;
    said container being formed at said one end with a second opening communicating with said rear section and the exterior of said container, dimensioned and located to admit said closure means and said film unit, trailing end foremost, into said rear section from the exterior of said container.

2. A photographic film assemblage as defined in claim 1 wherein the aggregate volume of said forward and rear sections is sufficient to contain substantially only the film units and closure means contained in said forward section.

3. A photographic film assemblage as defined in claim 1 including a plurality of said film units arranged in stacked relation in said forward section, said divider means being adapted to urge said film units forwardly to locate the forwardmost of said film units against said forward wall in position for exposure and to be moved leading end foremost through said first opening.

4. A photographic film assemblage as defined in claim 3 wherein the aggregate volume of the said forward and rear sections is sufficient to contain substantially only said film units and said closure means contained in said forward chamber.

5. A photographic film assemblage as defined in claim 4 wherein said first opening is located closely adjacent said forward wall, said container includes at least rear wall portions joined to said side walls and extending toward one another from said side walls and said second opening is located closely adjacent said rear wall portions.

6. A photographic film assemblage as defined in claim 5 wherein said rear wall portions are in the form of flanges on said side walls extending toward one another for engaging the lateral margins of a film unit located within said rear section.

7. A photographic film assemblage as defined in claim 3 further including film engagement means extending rearwardly within said rear section to at least the forward edge of said second opening for preventing movement of said film units from said container through said second opening while permitting movement of said film units into said container through said second opening.

8. A photographic film assemblage as defined in claim 3 wherein said divider means include support means for engaging the rearmost film unit in said forward section and resilient means located behind said support means for biasing said support means toward said forward wall to reduce the volume of said forward section and increase the volume of said rear section upon withdrawal of one of said film units from said forward section.

9. A photographic film assemblage as defined in claim 8 wherein said container includes at least rear wall portions joined to said side walls and extending toward one another and said resilient means extend into said rear chamber and are supported against said rear wall portions.

10. A photographic film assemblage as defined in claim 3 wherein said divider means include a barrier for preventing the passage of light between said forward and said rear sections of said container.

11. A photographic film assemblage as defined in claim 3 wherein each of said film units is independent of the others.

12. A photographic film assemblage as defined in claim 11 wherein each of said film units includes at least a light-opaque layer located behind said layer of said photosensitive image-recording material.

13. A photographic film assemblage as defined in claim 3 wherein at least a wall of said container includes an opening providing access to said forwardmost film unit by means for engaging and moving said forwardmost film unit, leading end foremost, through said first opening.

14. A photographic film assemblage comprising, in combination:

a container including forward, side and end walls, and at least a rear wall portion joined to each of said side walls and extending toward the opposite side wall;

divider means located between said forward wall and said rear wall portions dividing said container into separate forward and rear sections;

said container being formed at one end with a first opening communicating with said forward section and the exterior of said container and a second opening communicating with said rear section and the exterior of said container, each of said openings being adapted to pass a photographic film unit, edge foremost, between one of said sections and the exterior of said container;

a plurality of film units contained within said container and each including at least a first layer for forming an image when exposed to actinic radiation and at least a second layer for aiding in the distribution of a photographic liquid processing composition within said film unit for permeation into said first layer to initiate formation of a visible image within said each film unit;

said film units including at least a first film unit supported within said forward section with the first layer of said first film unit located in position for exposure and at least a second film unit within said rear section, said second film unit containing a visible image and being arranged in said second section with the first and second layers thereof disposed relative to the front of the said container in the same order as said layers of said first film unit; and said container further is formed with a third opening located at the other end of said container, said third opening communicating between the interior of said rear section and the exterior of said container for passing at least one of said second film units from said rear section to the exterior thereof.

15. A photographic film assemblage as defined in claim 14 wherein said first film unit is supported in position for exposure against said forward wall and said first opening constitutes the only opening in said forward section permitting movement of said first film, leading edge foremost, from exposure position within said forward section.

16. A photographic film assemblage as defined in claim 14 wherein the aggregate volume of said forward and rear sections is fixed and is sufficient to contain substantially only said film units originally contained in said forward section.

17. A photographic film assemblage as defined in claim 14 wherein each of said film units is independent of the others.

18. A photographic film assemblage as defined in claim 17 wherein each of said film units includes at least a light-opaque layer located behind said forward layer of said each film unit.

19. A photographic film assemblage as defined in claim 14 wherein said forward wall of said container includes an opening overlying the leading end of said forwardmost film unit adjacent to a lateral edge thereof to provide access to said forwardmost film unit by means for engaging and moving said forwardmost film unit leading end foremost through said first opening.

20. A photographic film assemblage as defined in claim 14 further including a plurality of said film units arranged in stacked relation within said rear section, each of said film units within said rear section having been previously contained within said forward section.

21. A photographic film assemblage as defined in claim 14 wherein said divider means include a barrier for preventing the passage of light between said forward and said rear sections of said container.

22. A photographic film assemblage comprising, in combination:

a container including forward, side and end walls;

divider means located behind said forward wall dividing said container into forward and rear sections;

a plurality of photosensitive film units each including a layer of a photosensitive image recording material and a liquid processing composition for initiating formation of a visible image upon permeation into said layer following exposure thereof;

said film units being disposed in said forward section in stacked relation and said divider means being movable at least forwardly within said container to urge a forwardmost one of said film units toward said forward wall into position for exposure and to reduce the volume of said forward section while increasing the volume of said rear section upon withdrawal of said forwardmost film unit from said forward section;

said container being formed at one end with a first opening communicating with said forward section and the exterior of said container and being dimensioned and located to pass said forwardmost film unit, leading end foremost, from the exposure position of said forwardmost film unit to the exterior of said container;

said container being formed at said one end with a second opening communicating with said rear section and the exterior of said container, dimensioned and located to admit said forwardmost film unit, trailing end foremost, into said rear section from the exterior of said container; and film engagement means extending rearwardly within said rear section to at least the forward edge of said second opening for preventing movement of said film units from said container through said second opening while permitting movement of said film units into said container through said second opening, said film engagement means including a resilient member extending rearwardly at least part way across said second opening, being deformable inwardly by engagement with a film unit during movement thereof through said second opening into said rear section and being mounted to resist deformation outwardly through said second opening.

23. A photographic film assemblage comprising, in combination:
  a container including forward, side and end walls;
  divider means located behind said forward wall dividing said container into forward and rear sections;
  a plurality of photosensitive film units each including a layer of a photosensitive image recording material and a liquid processing composition for initiating formation of a visible image upon permeation into said layer following exposure thereof;
  said film units being disposed in said forward section in stacked relation and said divider means being movable at least forwardly within said container to urge a forwardmost one of said film units toward said forward wall into position for exposure and to reduce the volume of said forward section while increasing the volume of said rear section upon withdrawal of said forwardmost film unit from said forward section;
  said container being formed at one end with a first opening communicating with said forward section and the exterior of said container and being dimensioned and located to pass said forwardmost film unit, leading end foremost, from the exposure position of said forwardmost film unit to the exterior of said container;
  said container being formed at said one end with a second opening communicating with said rear section and the exterior of said container, dimensioned and located to admit said forwardmost film unit, trailing end foremost, into said rear section from the exterior of said container;
  said divider means include support means for engaging the rearmost film unit in said forward section and resilient means located behind said support means for biasing said support means toward said forward wall to reduce the volume of said forward section and increase the volume of said rear section upon withdrawal of one of said film units from said forward section; and
  said container further includes at least rear wall portions joined to said side walls and extending toward one another and said resilient means extend into said rear chamber and are supported against said rear wall portions, said resilient means include at least a guide member for guiding said film units, introduced through said second opening, between said resilient means and said rear wall portions.

24. A photographic film assemblage as defined in claim 23 including at least an opening underlying said guide member adjacent said one end providing access to said guide member by means within photographic apparatus in which said film assemblage is employed.

25. A photographic film assemblage comprising, in combination:
  a container including forward, side and end walls;
  divider means including a battery located behind said forward wall dividing said container into forward and rear sections;
  a plurality of photosensitive film units each including a layer of a photosensitive image recording material and a liquid processing composition for initiating formation of a visible image upon permeation into said layer following exposure thereof;
  said film units being disposed in said forward section in stacked relation and said divider means being movable at least forwardly within said container to urge a forwardmost one of said film units toward said forward wall into position for exposure and to reduce the volume of said forward section while increasing the volume of said rear section upon withdrawal of said forwardmost film unit from said forward section;
  said container being formed at one end with a first opening communicating with said forward section and the exterior of said container and being dimensioned and located to pass said forwardmost film unit, leading end foremost, from the exposure position of said forwardmost film unit to the exterior of said container;
  said container being formed at said one end with a second opening communicating with said rear section and the exterior of said container, dimensioned and located to admit said forwardmost film unit, trailing end foremost, into said rear section from the exterior of said container.

26. A photographic film assemblage as defined in claim 25 further including electrically conductive elements extending from the terminals of said battery to the exterior of said container where said conductive elements are attached to the exterior of a wall thereof.

27. A photographic film assemblage as defined in claim 26 wherein said conductive elements extend from said housing through one of said first and second openings and are attached, at said one end of said container, to one of said end walls.

28. A photographic film assemblage as defined in claim 27 wherein said conductive elements extend through said first opening.

29. A photographic film assemblage comprising, in combination:
  a container including forward, side and end walls;
  divider means located behind said forward wall dividing said container into forward and rear sections;
  a plurality of photosensitive film units each including a layer of a photosensitive image recording material and a liquid processing composition for initiating formation of a visible image upon permeation into said layer following exposure thereof;
  said film units being disposed in said forward section in stacked relation and said divider means being movable at least forwardly within said container to urge a forwardmost one of said film units toward said forward wall into position for exposure and to reduce the volume of said forward section while increasing the volume of said rear section upon withdrawal of said forwardmost film unit from said forward section;
  said container being formed at one end with a first opening communicating with said forward section and the exterior of said container and being dimensioned and located to pass said forwardmost film unit, leading end foremost, from the exposure position of said forwardmost film unit to the exterior of said container; and
  said container further being formed at said one end with a second opening communicating with said rear section and the exterior of said container, dimensioned and located to admit said forwardmost film unit, trailing end foremost, into said rear section from the exterior of said container and a third opening located at the other end of said container and communicating between the interior of said rear section and the exterior of said container, said third opening being dimensioned to permit the movement of at least one of said film units at a time through said third opening.

30. A photographic film assemblage as defined in claim 29 further including an exposure aperture in said forward wall and closure means for preventing admission of light through said aperture and at least said first opening prior to loading of said film assemblage into photographic exposure apparatus, said closure means being movable from said container through said first opening.

31. A photographic film assemblage comprising, in combination:
   a container including forward, side and end walls, and at least rear wall portions extending from said side walls toward one another;
   a plurality of film units arranged in stacked relation within said container, each of said film units including a layer of a photosensitive image recording material; and
   support means for urging said film units toward said forward wall;
   said forward wall being formed with an aperture for transmitting light to expose the forwardmost film unit;
   said container being formed at one end with a first opening located adjacent the leading end of the forwardmost film unit for passing said forwardmost film unit, leading end foremost, from said container, and a second opening located adjacent said rear wall portions for admitting one of said film units at a time, trailing end foremost, into said container from the exterior thereof; and
   closure means for preventing admission of light through said aperture and said first opening prior to loading of said film assemblage into photographic exposure apparatus, said closure means including at least a first closure portion for said aperture and at least a second closure portion associated with said first opening, said closure means being movable, leading end first, from said container through said first opening and back into said container through said second opening.

32. A photographic film assemblage as defined in claim 31 further including divider means mounted intermediate said forward and rear wall portions for movement at least forwardly, said divider means dividing said container into forward and rear sections of variable capacity; said film units being arranged in stacked relation in said forward section prior to withdrawal through said first opening; said rear section being dimensioned to receive and contain in stacked relation, film units withdrawn from said forward section and introduced into said container through said second opening.

33. A photographic film assemblage as defined in claim 32, further including resilient means for biasing said divider means toward said forward wall to reduce the volume of said forward section and increase the volume of said rear section as one of said film units is withdrawn from said forward section.

34. A photographic film assemblage as defined in claim 33 wherein said resilient means are engaged between said divider means and said rear wall portions for biasing said divider means toward said forward wall.

35. A photographic film assemblage as defined in claim 34 wherein said resilient means include at least a guide member for guiding said film units, introduced through said second opening between said resilient means and said rear wall portions.

36. A photographic film assemblage comprising, in combination:
   a container including forward, side and end walls, and at least rear wall portions extending from said side walls toward one another;
   a plurality of film units arranged in stacked relation within said container, each of said film units including a layer of a photosensitive image recording material;
   support means for supporting said film units against said forward wall;
   said forward wall being formed with an aperture for transmitting light to expose the forwardmost film unit;
   said container being formed at one end with a first opening located adjacent the leading end of the forwardmost film unit for passing said forwardmost film unit, leading end foremost, from said container, and a second opening located adjacent said rear wall portions for admitting one of said film units at a time, trailing end foremost, into said container from the exterior thereof; and
   flexible film engagement means extending rearwardly across at least a portion of said second opening for preventing movement of said film units from said container through said second opening, said film engagement means being deformable inwardly to permit movement of said film units into said container through said second opening.

37. A photographic film assemblage comprising, in combination:
   a container including forward, side and end walls, and at least rear wall portions extending from said side walls toward one another;
   a plurality of film units arranged in stacked relation within said container, each of said film units including a layer of a photosensitive image recording material;
   support means for supporting said film units against said forward wall;
   said forward wall being formed with an aperture for transmitting light to expose the forwardmost film unit;
   said container being formed at one end with a first opening located adjacent the leading end of the forwardmost film unit for passing said forwardmost film unit, leading end foremost, from said container, and a second opening located adjacent said rear wall portions for admitting one of said film units at a time, trailing end foremost, into said container from the exterior thereof;
   divider means mounted intermediate said forward wall and rear wall portions for movement at least forwardly, said divider means dividing said container into forward and rear sections of variable capacity; said film units being arranged in stacked relation in said forward section prior to withdrawal through said first opening; said rear section being dimensioned to receive and contain in stacked relation, film units withdrawn from said forward section and introduced into said container through said second opening;

resilient means engaged between said divider means and said rear wall portions for biasing said divider means toward said forward wall to reduce the volume of said forward section and increase the volume of said rear section as one of said film units is withdrawn from said forward section, said resilient means include at least a guide member for guiding said film units, introduced through said second opening between said resilient means and said rear wall portions; and said rear wall portions define at least an opening located adjacent said second opening behind said guide member providing access to said guide member by means within photographic apparatus in which said film assemblage is employed.

38. A photographic film assemblage comprising, in combination:
   a container including forward, side and end walls, and at least rear wall portions extending from said side walls toward one another;
   a plurality of film units arranged in stacked relation within said container, each of said film units including a layer of a photosensitive image recording material;
   support means for supporting said film units against said forward wall;
   said forward wall being formed with an aperture for transmitting light to expose the forwardmost film unit;
   said container being formed at one end with a first opening located adjacent the leading end of the forwardmost film unit for passing said forwardmost film unit, leading end foremost, from said container, and a second opening located adjacent said rear wall portions for admitting one of said film units at a time, trailing end foremost, into said container from the exterior thereof; and
   divider means including a battery mounted intermediate said forward wall and rear wall portions for movement at least forwardly, said divider means dividing said container into forward and rear sections of variable capacity; said film units being arranged in stacked relation in said forward section prior to withdrawal through said first opening;
   said rear section being dimensioned to receive and contain in stacked relation, film units withdrawn from said forward section and introduced into said container through said second opening.

39. A photographic film assemblage as defined in claim 38 further including flexible, electrically conductive elements extending from terminals of said battery to the exterior of said container where said conductive elements are attached to the exterior of a wall thereof.

40. A photographic film assemblage as defined in claim 38 wherein said conductive elements extend from said container through one of said first and second openings.

41. A photographic film assemblage as defined in claim 40 wherein said conductive elements are secured to the exterior of said end wall intermediate said first and second openings.

42. A photographic film assemblage as defined in claim 40 wherein said container is formed with a third opening at the other end thereof located adjacent said rear wall portions for permitting the movement of at least one of said film units at a time from said container.

43. A photographic film assemblage as defined in claim 42 wherein said rear wall portions define an opening in the region of said third opening permitting engagement of a film unit introduced into said container through said second opening to permit withdrawal of the last mentioned film unit through said third opening.

44. Photographic film assemblage as defined in claim 38 wherein each of said film units is independent of the others.

45. A photographic film assemblage as defined in claim 44 wherein each of said film units includes at least a light-opaque layer located behind said layer of said photosensitive image-recording material.

46. A photographic film assemblage comprising, in combination:
   a container including forward, side and end walls, and a least a rear wall portion joined to each of said side walls and extending toward the opposite side wall;
   divider means located between said forward wall and said rear wall portions dividing said container into separate forward and rear sections;
   said container being formed at one end with a first opening communicating with said forward section and the exterior of said container and constituting the only opening in said forward section through which a film unit can be moved, leading edge foremost, and a second opening communicating with said rear section and the exterior of said container, each of said openings being adapted to pass a photographic film unit, edge foremost, between one of said sections and the exterior of said container;
   a plurality of film units contained within said container and each including at least a first layer for forming an image when exposed to actinic radiation and at least a second layer for aiding in the distribution of a photographic liquid processing composition within said film unit for permeation into said first layer to initiate formation of a visible image within said each film unit;
   said film units including a plurality of first film units arranged in stacked relation within said forward section with one of said first film units supported within said forward section against said forward wall with the first layer of said one film unit located in position for exposure and at least a second film unit within said rear chamber, said second film unit containing a visible image and being arranged in said second chamber with the first and second layers thereof disposed relative to the front of the said container in the same order as said layers of said one film unit;

resilient means for biasing said divider means forwardly to support said one film unit in position for exposure and decrease the volume of said forward section while increasing the volume of said rear section upon withdrawal of said one film unit from said forward section; and film engagement means associated with said second opening for preventing movement of a film unit from said rear section through said second opening and permitting movement of one of said first film units into said rear section through said second opening.

47. A photographic film assemblage comprising, in combination:

a container including forward, side and end walls, and at least a rear wall portion joined to each of said side walls and extending toward the opposite side wall;

divider means including a battery located between said forward wall and said rear wall portions dividing said container into separate forward and rear sections;

said container being formed at one end with a first opening communicating with said forward section and the exterior of said container and constituting the only opening in said forward section through which a film unit may be moved, leading edge foremost, and a second opening communicating with said rear section and the exterior of said container, each of said openings being adapted to pass a photographic film unit, edge foremost, between one of said sections and the exterior of said container;

a plurality of film units contained within said container and each including at least a first layer for forming an image when exposed to actinic radiation and at least a second layer for aiding in the distribution of a photographic liquid processing composition within said film unit for permeation into said first layer to initiate formation of a visible image within said each film unit;

said film units including plurality of first film units arranged in stacked relation within said forward section with one of said first film units supported within said forward section against said forward wall with the first layer of said one film unit located in position for exposure and at least a second film unit within said rear chamber, said second film unit containing a visible image and being arranged in said second chamber with the first and second layers thereof disposed relative to the front of the said container in the same order as said layers of said one film unit; and resilient means for biasing said divider means forwardly to support said one film unit in position for exposure and decrease the volume of said forward section while increasing the volume of said rear section upon withdrawal of said one film unit from said forward section.

48. A photographic film assemblage comprising, in combination:

a container including forward, side and end walls, and at least a rear wall portion joined to each of said side walls and extending toward the opposite side wall;

divider means located between said forward wall and said rear wall portions dividing said container into separate forward and rear sections;

said container being formed at one end with a first opening communicating with said forward section and the exterior of said container and constituting the only opening in said forward section through which a film unit may be moved, leading edge foremost, and a second opening communicating with said rear section and the exterior of said container, each of said openings being adapted to pass a photographic film unit, edge foremost, between one of said sections and the exterior of said container;

a plurality of film units contained within said container and each including at least a first layer for forming an image when exposed to actinic radiation and at least a second layer for aiding in the distribution of a photographic liquid processing composition within said film unit for permeation into said first layer to initiate formation of a visible image within said each film unit;

said film units including a plurality of first film units arranged in stacked relation within said forward section with one of said first film units supported within said forward section against said forward wall with the first layer of said one film unit located in position for exposure and at least a second film unit within said rear chamber, said second film unit containing a visible image and being arranged in said second chamber with the first and second layers thereof disposed relative to the front of the said container in the same order as said layers of said one film unit;

resilient means for biasing said divider means forwardly to support said one film unit in position for exposure and decrease the volume of said forward section while increasing the volume of said rear section upon withdrawal of one of said one film unit from said forward section; and said container further is formed with a third opening located at the other end of said container, said third opening communicating between the interior of said rear section and the exterior of said container for passing at least one of said film units from said rear section to the exterior thereof.

* * * * *